United States Patent [19]

Nakagome et al.

[11] 4,034,404
[45] July 5, 1977

[54] SIGNAL COMBINING SYSTEM FOR BINARY PULSE SIGNALS

[75] Inventors: Yukio Nakagome, Yokohama; Yasuo Fukata, Mitaka, both of Japan

[73] Assignee: Kokusai Denshin Denwa Kabushiki Kaisha, Japan

[22] Filed: June 13, 1975

[21] Appl. No.: 586,722

Related U.S. Application Data

[63] Continuation-in-part of Ser. No. 459,719, April 10, 1974, abandoned.

[30] Foreign Application Priority Data

Apr. 12, 1973 Japan ............................ 48-40832

[52] U.S. Cl. .............................. 358/142; 179/15 R
[51] Int. Cl.² ...................................... H04J 3/16
[58] Field of Search ........ 340/347 DD; 179/15 BA, 179/15 AS, 15.55 R, 15.55 T; 178/DIG. 3

[56] References Cited
UNITED STATES PATENTS

| | | | |
|---|---|---|---|
| 3,270,321 | 8/1966 | Berkowitz | 179/15 BA UX |
| 3,311,707 | 3/1967 | Urquhart-Pullen | 179/15 AS |
| 3,644,680 | 2/1972 | Amano et al | 179/15 AS |
| 3,660,605 | 5/1972 | Rees | 179/15 AS |

Primary Examiner—Thomas J. Sloyan
Attorney, Agent, or Firm—Robert E. Burns; Emmanuel J. Lobato; Bruce L. Adams

[57] ABSTRACT

A signal combining system employed for transmitting a plurality of pulse signals, in which if binary information of the same polarity is continuously transmitted for a period of time, in comparison with the last bit of the preceding period of time, in a main input communication circuit such as a facsimile circuit, signal combining is effected to insert therein other prestored binary information from another communication circuit. The above signal combining is performed for information blocks, each of which includes at least one sign bit for distinguishing pulse signals of the main communication circuit and another communication circuit from one another.

3 Claims, 7 Drawing Figures

SIGNAL COMBINING SYSTEM FOR BINARY PULSE SIGNALS

This application is a continuation-in-part of our co-pending application, Ser. No. 459,719 filed on Apr. 10, 1974, and now abandoned.

BACKGROUND OF THE INVENTION

This invention relates to a signal combining system employed for efficiently transmitting of a plurality of pulse signals.

In conventional facsimile telegraphy, use is made of a system in which a received binary signal is sampled so that the sampled pulses are transmitted as they are. This does not present any problem in a case where polarity reversals of the binary pulse signal closely occur to one another. However, in a case where the polarity reversals are sparse and the run length is long, the binary information of the same polarity is transmitted for a long period of time, so that the above system is uneconomical. To avoid this defect, a system in which the frequency band is reduced by transmitting the run length in a coded signal configuration is also employed. However, in a case where the density of transition instants is high, this system instead requires a wider frequency band, which makes it impossible to attain the original object of this system.

SUMMARY OF THE INVENTION

An object of this invention is to provide a signal combining system which is free from such defects of the prior art and capable of transmitting a plurality of pulse signals at the high efficient use of a predetermined transmission frequency transmission band.

In accordance with the principle of this invention, if information of the same polarity is continuously transmitted for a period of time, signal combining is effected to insert therein other pre-stored information.

A signal combining system of this invention comprises sampling means, first temporary storage means, polarity reversal detecting means, second temporary storage means, and signal combining means. The sampling means is provided for sampling a main input signal from a main communication circuit to obtain a binary pulse train. The first temporary storage means is employed for temporarily and successively storing therein pulses of the binary pulse train from the sampling means in the form of blocks each corresponding to a certain number of bits. The polarity reversal detecting means is provided for deriving therefrom a first output or a second output dependently on whether or not polarity reversal is present in the bit block stored in the temporary storage means in comparison with the last bit in a bit block immmediately preceding the same. At least one second temporary storage means is provided for temporarily storing therein secondary input information from at least one secondary input communication circuit. The signal combining means is employed for combining the information stored in the first and second temporary storage means together in response to the first and second outputs from the polarity reversal detecting means respectively together with at least one sign bit discriminating their contents form each other. A converted output corresponding to a composite signal of the main input signal and the secondary input information is derived at the output of the signal combining means.

BRIEF DESCRIPTION OF THE DRAWINGS

The principle, construction and operations of this invention will be clearly understood from the following detailed description taken in conjunction with the accompanying drawings, in which.

DESCRIPTION OF THE PREFERRED EMBODIMENT

Figure 1:
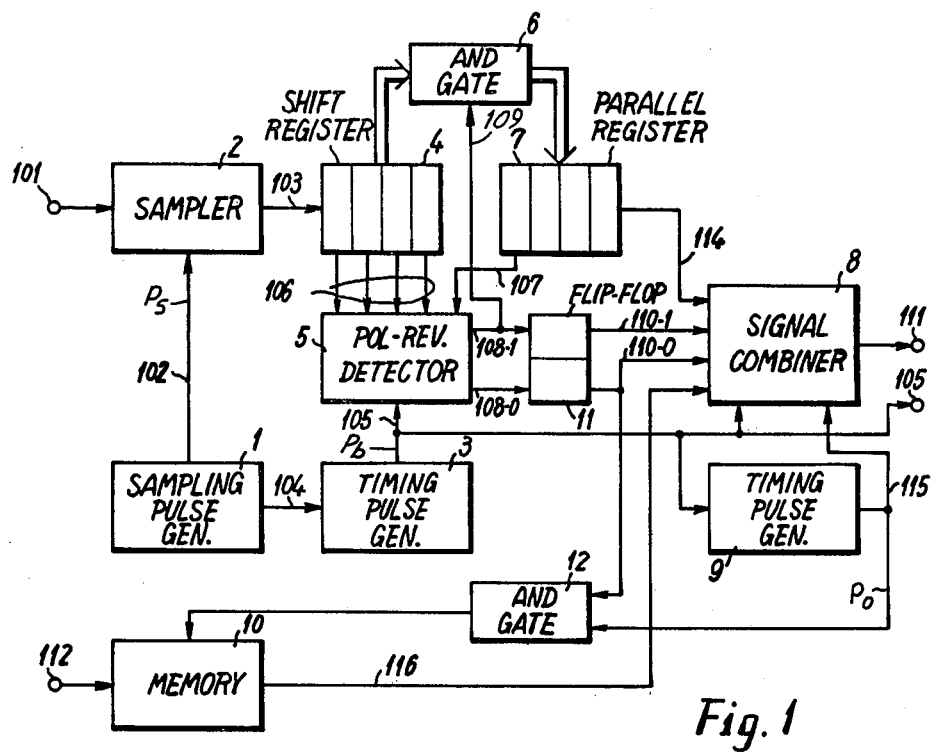
FIG. 1 is a block diagram illustrating an embodiment of this invention.

With reference to FIG. 1, an example of this invention will be described. In FIG. 1, a reference numeral 1 designates a sampling pulse generator for generating sampling pulses; 2 indicates a sampler; 3 represents a timing pulse generator for counting the sampling pulses to produce a block timing pulse $P_b$ for each block of a predetermined number of sampling pulses; 4 identifies a shift register for temporarily storing therein binary pulses from the sampler 2 every certain number of bits; 5 denotes a polarity reversal detector employed as the polarity reversal detecting means for detecting the presence of polarity reversal in each bit block in the shift register 4; 6 shows a gate circuit; 7 refers to a parallel register; 8 identifies a signal combiner; 9 denotes a timing pulse generator for generating timing pulses Po; 10 indicates a memory employed as the second temporary storage means; 11 a flip flop circuit; and 12 an AND gate. Circuits 4, 6 and 7 form the first temporary storage means. Circuits 3, 8, 9 and 11 form the signal combining means.

An input signal applied from a main input communication circuit through an input terminal 101 is sampled in the sampler 2 by the sampling pulses Ps (shown in FIG. 4) supplied thereto from the sampling pulse generator 1 through a line 102 to provide sampled binary pulses, which are applied to the shift register 4 through a line 103. The shift register 4 sequentially shifts the binary pulses to successively provide bit blocks of four bits. The timing pulse generator 3 receives the sampling pulses from the sampling pulse generator 1 through a line 104 and, when having counted four pulses, instructs the completion of counting to the polarity reversal detector 5, the signal combiner 8 and the timing pulse generator 9 through a line 105. Then, the polarity reversal detector 5 compares the polarity of each bit of the shift register 4 applied through a set of lines 106 with the polarity of a left-most bit 7-1 in the parallel register 7 supplied through a line 107. If these five bits contain any bit of information of different polarity from one another the block is called a significant bit block, the polarity reversal detector 5 sets the output 110-1 of the flip-flop circuit 11 to the state 1 through a line 108-1 in synchronism with block timing pulses $P_b$ shown in FIG. 4 and further applies a gate pulse to the AND gate 6 through a line 109. The contents of the register 4 are transferred to the parallel register 7 through the gate 6. In the absence of any bit of information of different polarity in the register 4 in comparison with the state of the bit 7-1 the block is called a idle bit block, an output is applied to a line 108-0 so that the flip-flop circuit 11 is reset to the state 0 so as to cause the output 110-0 to be the state 1.

Figure 2:
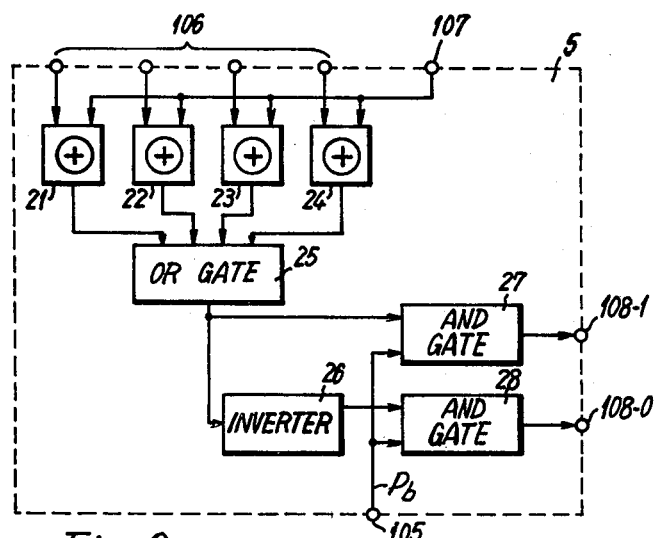
FIG. 2 is a block diagram illustrating an example of a polarity reversal detector employed in the embodiment shown in FIG. 1.

An example of the polarity reversal detector 5 is shown in FIG. 2. Each of exclusive OR circuits 21, 22, 23 and 24 compares each bit of the register 4 with the state of the bit 7-1 of the register 7, so that an output 0 or 1 is generated in response to coincidence and the absence of coincidence with each other respectively. The outputs of the exclusive OR circuits 21, 22, 23 and 24 pass through an OR gate 25. The output of the OR gate 25 is directly applied to an AND gate 27 and further applied to an AND gate 28 through an inverter 26. These AND gates 27 and 28 are controlled by the block timing pulses $P_b$ supplied through a line 105. A pulse is obtained on the line 108-1 in case of the output 1 of the OR gate 25 in synchronism with the block timing pulses $P_b$, and a pulse is obtained on the line 108-0 in case of the output 0 of the OR gate 25 in synchronism with the block timing pulses $P_b$.

Figure 4:
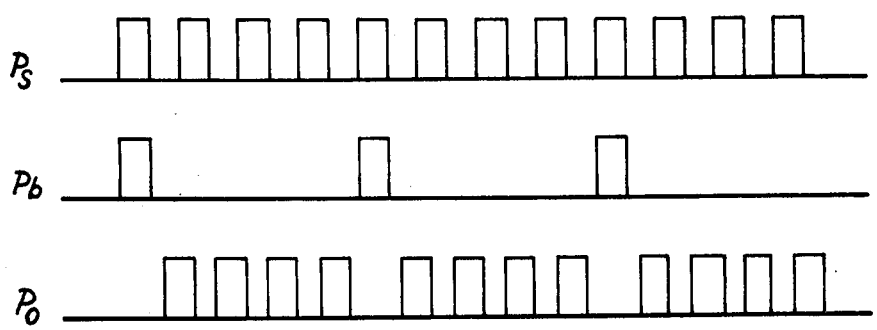
FIGS. 4 and 7 show time charts explanatory of the operation of the embodiment shown in FIG. 1.

The block timing pulse generator 9 generates on a line 115 four-bit pulses (i.e. the timing pulses $P_o$) shown in FIG. 4 in synchronism with each of the block timing pulses $P_b$. The signal combiner 8 examines the state of the flip-flop circuit 11 through lines 110-1 and 110-0. In a case where the flip-flop circuit 11 is set to the state 1, that is in case of a significant bit block in the shift register 4, the transferred contents of the parallel register 7 are added with a flag bit 0 in synchronism with block timing pulses $P_b$ supplied through the line 105, and the contents of the register 7 are read out through the output terminal 111 of the signal combiner 8 in synchronism with the timing pulses $P_o$ supplied through the line 115. In a case where the flip flop circuit 11 is set to the state 0, that is, in case of an idle bit block in the register 4, four bits of information of another secondary input communication circuit, which was previously received and stored in the memory 10 through its input terminal 112, are read out from the memory 10 in synchronism with the timing pulses $P_o$ supplied through an AND gate 12, so that a flag bit 1 is added with the read out four bits of information.

Figure 7:
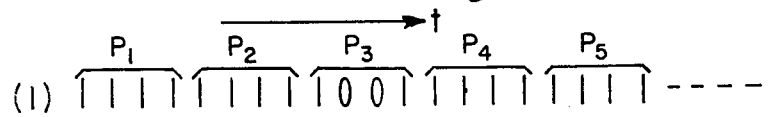
Figure 7:
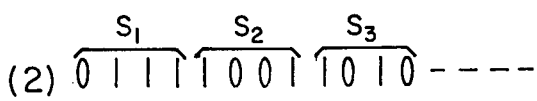
Figure 7:
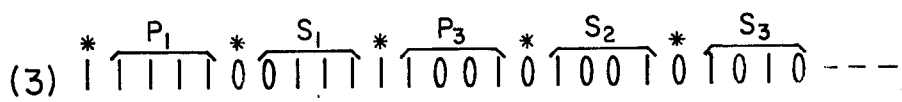

Examples of the input signals from the main input communication circuit (referred to as main circuit) and the secondary input communication circuit (referred to as secondary circuit) are respectively illustrated as pulse trains (1) and (2) in FIG. 7. A pulse train (3) is a combined output pulse train. At first, the first bit block $P_1$ from the main circuit is sent out to the output pulse train (3) together with a flag bit 1. Since each bit of the second bit block $P_2$ of the main circuit has the same state as the last bit of the first block $P_1$, a flag bit is changed to the state 0 and combined with the first bit block $S_1$ from the secondary circuit. Next, since the third bit block $P_3$ has bits of state 0 different from the last bit of the bit block $P_2$, this bit block $P_3$ is sent out to the output pulse train (3) together with a flag bit 1. Thereafter, since all the bits of the next blocks $P_4$ and $P_5$ have the same state as the last bit of the third bit block $P_3$ from the main circuit, the second bit block $S_2$ and the third bit block $S_3$ of the secondary circuit are sent out to the output pulse train (3) together with flag bit 0.

Figure 3:
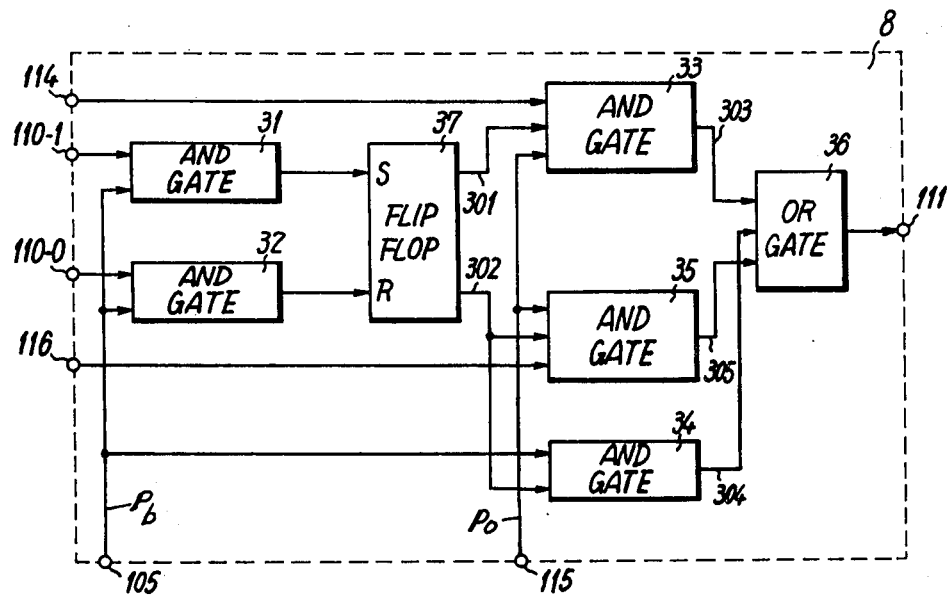
FIG. 3 is a block diagram illustrating an example of a signal combiner employed in the embodiment shown in FIG. 1.

An example of the signal combiner 8 is shown in FIG. 3. When the line 110-1 assumes the state 1 in case of significant bit block in the register 4, a flip-flop circuit 37 is set to the state 1 through an AND gate 31 in synchronism with the block timing pulses $P_b$ supplied through the line 105 so that the output 301 of the flip flop circuit 37 assumes the state 1. When the output 1 of the flip-flop circuit 37 is applied to an AND gate 33, the AND gate 33 passes through a line 303 to an OR gate 36 the contents of the parallel register 7 supplied through a line 114 in synchronism with the timing pulses $P_o$ supplied through the line 115. Since the flag bit assumes the state 0 in case of a significant bit block in the register 4, no pulse is applied to the OR gate 36 in synchronism with the block timing pulses $P_b$. When the line 110-0 assumes the state 1 in case of an idle bit block in the register 4, the flip flop circuit 37 is reset to the state 0 through an AND gate 32 so that the output 302 of the flip flop circuit 37 assumes the state 1. The output 302 of the state 1 is applied to AND gates 34 and 35. The timing pulse $P_b$ supplied through the line 105 passes through the AND gate 34 and is applied to the OR gate 36 through a line 304 as the flag bit 1. When the output 302 of the state 1 is applied from the flip-flop circuit 37 to the AND gate 35, the AND gate 35 passes the contents of the memory 10 applied through a line 116 to the OR gate 36 through a line 305 in synchronism with the timing pulses $P_o$ supplied through the line 115. The OR gate 36 passes information bits applied through the lines 303, 304 and 305 to the output terminal 111, so that the flag bit is obtained through the AND gate 34 and the line 304 in synchronism with the block timing pulses $P_b$ while the output information bits are obtained in synchronism with the timing pulses $P_o$.

Figure 5:
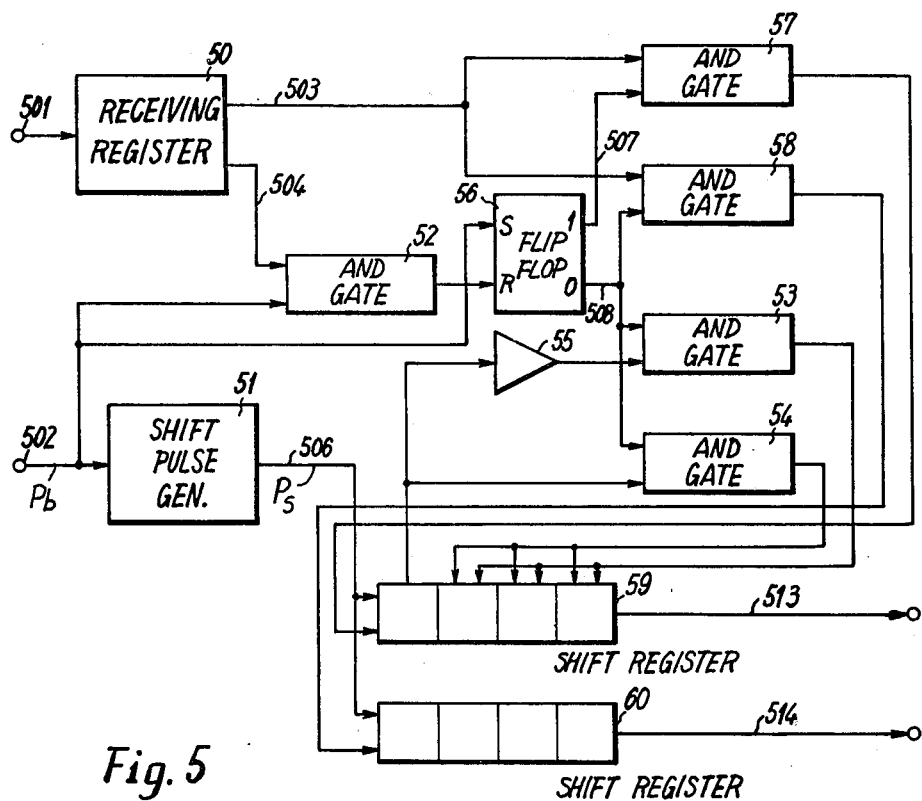
FIG. 5 is a block diagram illustrating an example of a circuit for reconverting a converted output obtained in accordance with this invention.

With reference to FIG. 5, an example of a circuit in which the converted output obtained from the circuit shown in FIG. 1 is reconverted will be described. A reference numeral 50 indicates a receiving register, which temporarily stores therein information blocks received through a line 501. An AND gate 52 produces an output bit of the state 1 in synchronism with block timing pulses supplied from a terminal 502 in response to a flag bit 1 applied to a line 504 from the receiving register 50. A flip flop circuit 56 is set to the state 1 so as to cause the output 507 to be the state 1 in synchronism with the block timing pulses supplied through the line 502 at the start of each block of the received information. The flip flop circuit 56 is reset to the state 0 so as to cause the output 508 to be the state 1. When the line 507 assumes the state 1 in case of the flag bit 0, an AND gate 57 is opened so that the contents of the receiving register 50 pass through the opened gate 57 and are stored in a shift register 59. On the other hand, if the line 508 assumes the state 1 in case of the flag bit 1, an AND gate 58 is opened so that the contents of the receiving register 50 pass through the opened gate 58 and are stored in a shift register 60. The output 508 of the state 1 is also applied to AND gates 53 and 54, which are employed for changing three right bits to the same state as the left most bit in the register 59. If the left most bit is the state 0 in the register 59, the left most bit of the state 0 is converted to the state 1 by an inverter 55 and applied to three right bits of the register 59 through the AND gate 53 to change the three right bits to the state 0. If the left most bit is the state 1 in the register 59, the left most bit of the state 1 passes through the AND gate 54 and is applied to three right bits of the register 59 to change the three right bits to the state 1. A shift pulse generator 51 generates timing pulses $P_x$ as shown in FIG. 4 on a line 506 in synchronism with the block timing pulses $P_b$ through the line 502. The shift registers 59 and 60 produce respective outputs on output lines 513 and 514 in synchronism with the shift pulses $P_x$ supplied through the line 506. Thus, the pulse information applied from the line 501 is distributed to either one of the shift registers 59 and 60 according to the state of the flag bits, so that the information pulses applied to the terminal 101 in FIG. 1 and those applied to the terminal 112 in FIG. 1 are reproduced at lines 513 and 514 in FIG. 5 respectively.

Figure 6:
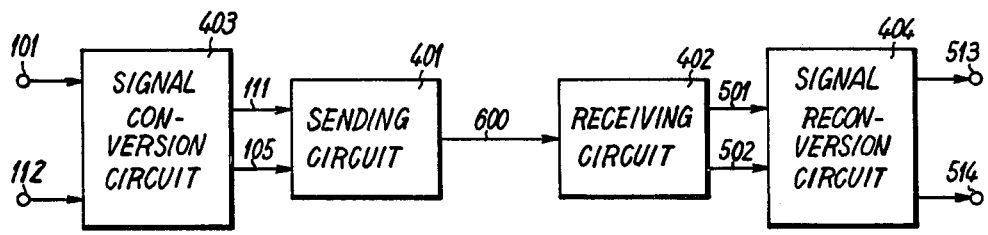
FIG. 6 is a block diagram illustrating an overall signal transmission system employing this invention.

With reference to FIG. 6, an example of an overall transmission system employing the circuits shown in FIGS. 1 and 5 will be described. In FIG. 6, a reference numeral 401 identifies a sending circuit, which receives the information blocks from the output terminal 111 of the signal conversion circuit 403 shown in FIG. 1 and the block timing pulses from the line 105 and transmits them through a transmission line 600 to a receiving circuit 402 while being synchronized therewith. The receiving circuit 402 applies the information blocks to the signal re-conversion circuit 404 shown in FIG. 5 through the line 501 and also applies the block timing pulses to the circuit 404 through the line 502.

In the above example, the secondary-communication circuit 112 added to the main communication circuit 101 is shown to be one but, in a case where the signal transmission speed of the secondary-communication circuit is low, it is also possible to provide a plurality of memory circuits 10 and to assemble a plurality of secondary-communication circuits with the main communication circuit. In this case, flag bits of more than two bits are employed.

As has been described in the foregoing, desired pre-stored information can be successively inserted at any occurrence of idle bit block in accordance with this invention, so that it is also possible to achieve multiplex transmission, such as a combination of real time transmission-facsimile and storage and re-transmission-facsimile, a combination of facsimile and data, or, a combination of facsimile and telegraphy. Further, with band width compression, no buffer memory is provided for each communication circuit, so that real time transmission is possible and the cost per communication circuit is reduced.

What we claim is:
1. A signal combining system comprising:
    sampling means for successively sampling a main input signal from a main input communication circuit to obtain a binary pulse train;
    first temporary storage means connected to said sampling means for temporarily and successively storing therein pulses of the binary pulse train in the form of blocks each corresponding to a certain number of bits;
    polarity reversal detecting means connected to said first temporary storage means for deriving therefrom a first output and a second output depending on whether or not polarity reversal is present in the bit block stored in the first temporary storage means in comparison with the last bit in a bit block immediately preceding the same;
    at least one second temporary storage means for temporarily storing therein secondary input information from at least one secondary input communication circuit; and
    signal combining means connected to said first temporary storage means, and secondary temporary storage means and said polarity reversal detecting means for combining, as a converted output, the contents of said first temporary storage means in response to the first output of said polarity reversal detecting means and the contents of said second temporary storage means in response to the second output of said polarity reversal detecting means, respectively, together with a sign bit appended to each of the combined blocks of bits for indicating in which of said first and second temporary storage means the respective combined blocks of bits were stored.

2. A signal combining system according to claim 1, in which said signal combining means comprises a flip-flop circuit set and reset in response to the first output and the second output of said polarity reversal detecting means, a block timing pulse generator for generating block timing pulses, and a signal combiner connected to said first temporary storage means, said second temporary storage means, said flip-flop circuit and said block timing pulse generator for combining contents of said first temporary storage means and said second temporary storage means so that the contents of said first temporary storage means are sent out in response to each of said block timing pulses in case of a predetermined state of said flip-flop circuit while the contents of said second temporary storage means are sent out in response to each of said block timing pulses in case of the other state of said flip-flop circuit.

3. A signal combining system, comprising:
    first storage means for temporarily storing a binary pulse train in the form of a sequence of binary bits grouped in bit blocks of equal numbers of bits;
    polarity reversal detecting means, connected to said first storage means, for developing reversal signal indicating a reversal in bit polarity within a bit block, in said first storage means, from the polarity of the last bit of an immediately preceding bit block, for each of the successive bit blocks in said first storage means;
    second storage means for storing secondary information in the form of a sequence of binary bits grouped in bit blocks of bits equal in number to the number of bits comprising bit blocks stored in said first storage means; and
    signal combining means, connected to receive bit blocks from said first storage means, bit blocks from said second storage means, and the polarity reversal signals, for sequentially combining successive bit blocks from said first storage means having bit polarity reversals and successive bit blocks from said second storage means in place of bit blocks from said first storage means which do not have apolarity reversal, and for appending to each bit block in the sequence of combined bit blocks a corresponding sign bit indicative of in which of said storage means the corresponding bit block was stored.

* * * * *